United States Patent
Bharghavan et al.

(10) Patent No.: US 8,369,794 B1
(45) Date of Patent: Feb. 5, 2013

(54) ADAPTIVE CARRIER SENSING AND POWER CONTROL

(75) Inventors: Vaduvur Bharghavan, Morgan Hill, CA (US); Sharanya Srinivasan, Edina, MN (US)

(73) Assignee: Meru Networks, Sunnyvale, CA (US)

( * ) Notice: Subject to any disclaimer, the term of this patent is extended or adjusted under 35 U.S.C. 154(b) by 581 days.

(21) Appl. No.: 12/487,156

(22) Filed: Jun. 18, 2009

Related U.S. Application Data

(60) Provisional application No. 61/073,472, filed on Jun. 18, 2008.

(51) Int. Cl.
*H04B 7/00* (2006.01)
*H04L 12/413* (2006.01)
*H04J 12/26* (2006.01)

(52) U.S. Cl. .......... 455/69; 455/522; 370/445; 370/252

(58) Field of Classification Search ............ 455/69, 455/127.1, 522; 370/445, 253
See application file for complete search history.

(56) References Cited

U.S. PATENT DOCUMENTS

| | | | |
|---|---|---|---|
| 5,038,151 A | 8/1991 | Kaminski | |
| 5,553,316 A * | 9/1996 | Diepstraten et al. | 370/445 |
| 5,946,346 A * | 8/1999 | Ahmed et al. | 375/219 |
| 5,966,094 A | 10/1999 | Ward et al. | |
| 6,157,616 A * | 12/2000 | Whitehead | 370/252 |
| 6,760,318 B1 | 7/2004 | Bims | |
| 6,788,658 B1 | 9/2004 | Bims | |
| 6,839,038 B2 | 1/2005 | Weinstein | |
| 6,850,498 B2 * | 2/2005 | Heath et al. | 370/328 |
| 6,894,649 B2 | 5/2005 | Ostervall | |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,107,498 B1 * | 9/2006 | Schmidt et al. | 714/704 |
| 7,319,685 B2 | 1/2008 | Kim et al. | |
| 7,333,455 B1 | 2/2008 | Bolt et al. | |
| 7,359,362 B2 | 4/2008 | King et al. | |
| 7,512,097 B2 * | 3/2009 | Jelitto et al. | 370/329 |
| 7,649,868 B2 * | 1/2010 | Heath et al. | 370/332 |
| 7,720,029 B2 * | 5/2010 | Orava et al. | 370/329 |
| 7,852,764 B2 * | 12/2010 | Yamaguchi et al. | 370/231 |
| 2002/0009069 A1 * | 1/2002 | Kobayashi | 370/344 |
| 2004/0038645 A1 * | 2/2004 | Reunamaki et al. | 455/41.2 |
| 2005/0117543 A1 * | 6/2005 | Heath et al. | 370/329 |
| 2005/0152314 A1 | 7/2005 | Sun et al. | |
| 2007/0116033 A1 * | 5/2007 | Reunamaki et al. | 370/445 |
| 2007/0214247 A1 * | 9/2007 | Yang et al. | 709/223 |

(Continued)

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — Tilahun B Gesesse

(74) *Attorney, Agent, or Firm* — Law Office of Dorian Cartwright

(57) ABSTRACT

Carrier sensing and power control, or trade-off among two or more communication parameters, can provide relative improvement in throughput. A sensing threshold or transmission power are varied, thus altering a sensing range and a transmission quality, thus maximizing a feasible transmission rate. Transmission power and rate are collectively altered to find a best throughput rate. A transmission rate can incremented after successful transmission and decremented after failed transmission, the described increment possibly being less than the described decrement. Thus, pairs of transmissions where one fails and one succeeds decrease the net transmission rate. Smaller increments, with larger decrements, cause increases to increase throughput without degrading quality, while causing decreases to restore transmission quality if an increase does degrade transmission quality.

30 Claims, 6 Drawing Sheets

U.S. PATENT DOCUMENTS

| | | | |
|---|---|---|---|
| 2008/0009306 A1* | 1/2008 | Suga et al. | 455/522 |
| 2009/0303009 A1* | 12/2009 | Itasaki et al. | 340/10.1 |
| 2010/0317383 A1* | 12/2010 | Lee et al. | 455/501 |
| 2011/0003612 A1* | 1/2011 | Roy et al. | 455/522 |

OTHER PUBLICATIONS

Kitahara et al. "A base station adaptive antenna for downlink transmission in a DS-CDMA system." IEEE 51st Vehicular Technology Conference Proceedings, 2000 (Abstract).

Mahler et al. Design and optimisation of an antenna array for WiMAX base stations. IEEE/ACES International Conference on Wireless Communications and Applied Computational Electromagnetics, 2005 (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000 (Abstract).

Ponnapalli et al. "Design and packaging of antennas for wireless systems." Proceedings of Electrical Performance of Electrical Packaging, 1995 (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

ADAPTIVE CARRIER SENSING AND POWER CONTROL

BACKGROUND OF THE INDUSTRY

Wireless communication systems allow mobile stations to communicate with network resources without necessarily being coupled to the communication system using a wire-line. Connection quality can degrade when a wireless communication system is overtaxed, such as by excessive attempts to access the network. For example, communication delay might increase, communication might become incomplete, or communicated data might be lost.

Increasing transmission power can benefit throughput, but can introduce additional issues arising from interference with neighboring communication devices (e.g., overlap between multiple access points and their clients). Increased power alone can fail to address interference, with the effect of allowing reduced transmission quality. This has the effect that increased transmission power can, in response to transmitter interference, actually fail to provide a better throughput rate.

Techniques, including methods and systems, can also provide relatively improved communication in contexts other than wireless communication systems and in contexts other than trade-off between transmission power and data rate. For example and without limitation, a number of CDMA channels can cooperatively communicate a relatively greater number of messages when a density of CDMA codes is traded-off against signal compression.

SUMMARY OF THE DESCRIPTION

This application includes techniques, including systems and methods having the effect of, adaptive carrier sensing and power control, and more generally, trade-off among two or more parameters of a communication system, with the effect of improving relative throughput. For example and without limitation, a carrier sensing threshold or a transmission power might be varied, with the effects of altering a carrier sensing range and a quality of transmission, with the effect of altering a maximum feasible transmission rate. Transmission power and transmission rate can be collectively altered to find a best (or otherwise preferred) throughput rate.

In one aspect, a transmission rate is incremented in response to successful transmission and decremented in response to failed transmission. For example and without limitation, the described increment in transmission rate is substantially less than the described decrement in transmission rate, with the effect that if a failed transmission occurs substantially in sequence with a successful transmission, the net trans-mission rate is decreased. Relatively smaller increments on success, with relatively larger decrements on failure, have the effect that an increase in transmission rate is likely to increase throughput without degrading transmission quality, while a decrease in transmission rate is likely to restore transmission quality if an increase does degrade transmission quality.

DETAILED DESCRIPTION

Generality of the Description

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

After reading this application, those skilled in the art would see the generality of this description.

Furthermore, the invention is in no way limited to the specifics of any particular described examples. After reading this application, those skilled in the art would recognize that many other variations are possible which remain within the content, scope and spirit of the invention, and these variations could be made and used with undue experimentation or new invention.

DEFINITIONS

The general meaning of each of these terms or phrases is intended to be illustrative, and in no way limiting.

The phrase "access point", the term "AP", and the like, generally refer to devices capable of wireless communication with mobile devices, and possibly capable of wire-line communication with other devices. For example and without limitation, AP's might communicate with external devices using a L2/L3 network. However, in the context of the invention, there is no particular requirement that AP's have an actual wire-line communication link; AP's might communicate entirely wirelessly.

The phrases "computer readable media", "computer-executable instructions", and the like, generally refer to any physical medium capable of maintaining, however evanescently, information, and to any apparatus, arrangement of materials, or composition of matter, capable of operating in response thereto.

The phrases "successful transmission", "unsuccessful transmission", "failed transmission", and the like, generally refer to indicators or measures of whether or with what fidelity a transmission was received at its destination in comparison with its source.

The phrases "transmission power", and the like, generally refer to energy levels of electromagnetic fields associated with transmission of data.

The phrases "transmission quality", and the like, generally refer to indicators or measures of whether and with what fidelity a transmission is received at its destination in comparison with its source.

The phrases "transmission rate", and the like, generally refer to a measure of bits per second that are sent from a source and received at a destination. The phrases "wireless communication", and the like, generally refer to any and all communication having at least some component in which low-impedance physical conductors are not generally required.

Generality of the Invention

In wireless communication networks, or indeed in any communication network in which contention is possible, one known problem is that of assuring (with some known degree of reliability) that multiple senders are not each using the same communication channel concurrently. This can lead to data which is garbled or substantially lost, or even to entire messages which cannot reasonably be received, even if they were correctly generated at the sender.

While the discussion in this application is primarily presented with respect to wireless communication networks, and more specifically, with respect to contention for AP's (access points) by mobile stations in wireless communication networks, in the context of the invention, there is no particular reason to limit the concepts and solutions presented herein to those particular circumstances.

For a first example and without limitation, a wire-line communication system, such as an Ethernet—albeit one in which collisions might be more likely due to the extent of the medium—might exhibit problems similar to those described herein primarily with respect to wireless communication systems. Such problems might be exhibited when multiple senders attempt to seize use of the media, but have their transmissions collide due to flight time across the extent of the network.

For a second example and without limitation, a time-sharing communication system, such as a TDMA (time division multiple access) or TDD (time division duplex) system, might exhibit problems similar to those described herein primarily with respect to wireless communication systems. Such problems might be exhibited when multiple senders attempt to seize selected allocable time slots—for example, to increase the data transmission rate they can achieve—but find, similarly, that their transmissions collide due to flight time across the extent of the network.

For a third example and without limitation, a spread-spectrum communication system (such as CDMA or frequency-hopping, or a combination or conjunction thereof) might exhibit problems similar to those described herein primarily with respect to wireless communication systems. Such problems might be exhibited when (1) too many senders attempt to seize CDMA codes or frequency-hopping codes, with the effect that receivers cannot in general reliably assert that the data bits they receive are accurate. Such problems might alternatively be exhibited when (2) senders attempt to seize CDMA codes or frequency-hopping codes, and by their transmission power drown out other senders.

For a fourth example and without limitation, a multi-encoding communication system (such as one which makes use of symbols that encode more than one bit per symbol) might exhibit problems similar to those described herein primarily with respect to wireless communication systems. Such problems might be exhibited when (1) a first sender takes advantage of a multi-bit per symbol encoding to occupy a greater amount of signal bandwidth or time, while (2) a second sender also takes advantage of a multi-bit per symbol encoding to occupy a greater amount of signal bandwidth or time.

In each of these cases, it might occur that receivers will not be able to reliably assert that they have accurately received what was sent, nor will senders be able to reliably assert that what they sent was not lost to collision with other signals. As colliding signals are often indistinguishable to the sender and the receiver as noise, a type of arms race might arise in which multiple senders, each attempting to transmit at relatively higher data rate, each alter their transmission power or alter their noise sensitivity, with the collective effect that multiple senders each end up with lesser transmission capability than if they were able to cooperate.

Accordingly, after reading this application, those skilled in the art would recognize the wide applicability of the concepts and techniques described herein.

For a first example and without limitation, while the discussion in this application is primarily presented with respect to the two variables of transmission power and channel sensitivity, other pairs of variables, as shown above, might be applicable for coercing cooperation between multiple senders, multiple contenders for the same receiver, or other circumstances in which contention can occur.

For a second example and without limitation, while the discussion in this application is primarily presented with respect to only two alternative variables (transmission power and channel sensitivity), and one measure of service (transmission data rate), it might occur that there are three or more such alternative variables (e.g., bit-encoding density, CDMA code density, and transmission power) that might be dynamically changed.

For a third example and without limitation, it also, either separately or in combination or conjunction, might occur that there is more than one measure of service. For example, it might occur that both transmission data rate and data latency both important, or that transmission data rate and bit-error-rate are both important, or that bit-error-rate and QoS (quality of service) are both important, or that some selection of three or more such measures are concurrently important.

For a fourth example and without limitation, it also, either separately or in combination or conjunction, might occur that one or more measures of service might change in relative importance from time to time. For example, it might occur that bit-error-rate is most important for certain selected senders or receivers, while transmission data rate is most important for others. For example, it might occur that transmission data rate is most important for a first class of service (e.g., data transfer), while latency is most important to a second class of service (e.g., voice or video transmission).

For a fifth example and without limitation, it also, either separately or in combination or conjunction, might occur that one or more measures of service might differ in relative importance depending on which AP is being contended for, or depending on which channel is being contended for, or depending on how dense traffic has become in recent moments (or is expected to become in future moments).

Accordingly, this application should be read as broadly as possible to describe concepts and techniques, apparatuses and methods and the like, which can give effect to the distinctions between this description and that of any other device.

FIGURES AND TEXT BRIEF DESCRIPTION OF THE DRAWINGS

FIG. 1

Figure 1:
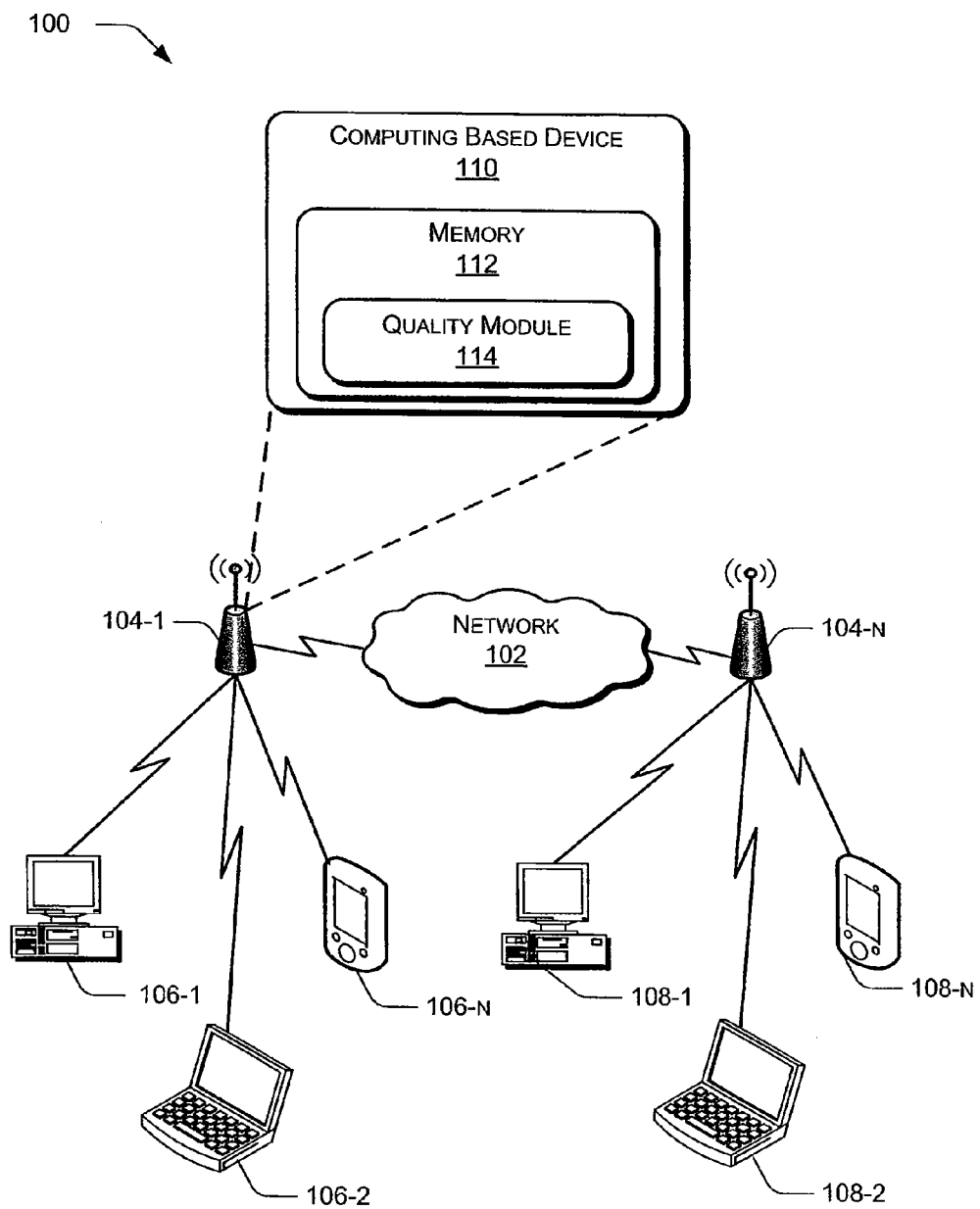
FIG. 1 is a conceptual drawing of a wireless communication network.

FIG. 1 is a conceptual drawing of a wireless communication network.

Carrier sensing enables communicating devices to manage a large number of competing transmissions to an intended AP. Carrier sensing can be implemented by varying a carrier sensing threshold value in a manner inversely proportional to a carrier sensing range. In this example, the carrier sensing range refers to the range within which concurrent transmissions from one or more communicating devices may occur.

Typically, the information exchange between an AP and one or more communicating devices is in the form of packets. These packets include intrinsic information that defines attributes of a given packet. Examples of such information include, but are not limited to, source-destination information, data information, and such. The intrinsic information is useful for recreating the data transmitted as packets, between APs and communicating devices, and helps in discerning one data from the other.

Therefore, an AP while receiving communication from communicating devices will not wait for the entire data to come through. The AP, on the other hand, will accept different data in segmented portions or packets. The given AP will receive data packets one by one. While the AP is receiving one data packet, other data packets wait for their turn. Only after the one data packet has been received, does the next packet proceeds. This is done so as to avoid a collision between the data packets, which may result in data loss.

The packets, along with their associated intrinsic information, can be used to recreate the entire transmitted data. Hence, at any given instance an AP may be concurrently receiving different data in the form of packets, from different communicating devices. Additionally, a large number of communicating devices, attempting to communicate with the AP, may result in data loss, due to packet collision at the AP.

Returning to the discussion for carrier sensing threshold, setting a high value of carrier sensing threshold value results in a low value of carrier sensing range. This geographically concentrates the number of communicating devices that can attempt to or communicate with an AP within certain proximity of the AP.

A smaller value of the carrier sensing range would limit the number of communicating devices that can communicate with the AP, as only those communication devices would be able to communicate with the AP that lie within an area specified through the carrier sensing range. An AP also experiences a time lag while communicating with communication devices that lie farther away from it. Limiting the carrier sensing range would result in the decrease in the time lag or the latency time experienced by an AP. This may result in a lesser number of concurrent transmissions at an AP. Hence communicating devices, displaced within close proximity of an AP will have lesser latency periods and consequently can result in increase in the number of concurrent transmission.

Each communication signal intended for an AP is associated with a trans-mission power. Adaptive power control mechanisms seek to control the transmission power of a communicating device. Generally, a communication having high transmission power has a better chance of completing transmission when compared to a communication having lower transmission power. However, too high a transmission power may cause interference in communications involving neighboring APs. For example, a communication signal having high transmission power has a tendency to interfere with the operations of APs in the neighborhood of the intended APs.

As communicating devices within a carrier sensing range may suffer from mutual interference, adaptive power control mechanisms maintain the transmission power of a current transmission to continue transmission at the current transmission rate. Both the techniques, as indicated, may increase throughput of a network. The increase of throughput however does not ensure or guarantee a proper quality of transmission.

In cases where both techniques are applied, it is desirable to determine the quality of transmission and then select a transmission rate based on the quality of the transmission. To this end, a module can be instrumented for determining the quality of transmission. The module makes use of an adaptive windowing mechanism. The module, for every successful transmission, can increase the transmissions rates by a certain factor. On the other hand, it retains a previously known transmission rate or decreases the current transmission rate, for a failed transmission. In this manner, preference is given to the quality of transmission in place of high throughput, as a high network throughput does not itself assure a success or quality in transmission.

FIG. 1 illustrates an exemplary network system 100 for implementing frame level adaptive carrier sensing and power control. The system 100 includes a network 102, for establishing communication between one or more access points 104(1)-(n). The access points 104(1)-(n) can be connected to the network 102 or to themselves through a wired or wireless mechanism. The access points 104(1)-(n) allow one or more communicating devices or client devices 106, 108 to access the network 102. The client devices 106, 108 and their associated resources can access the network 102 using electromagnetic waves (e.g., typically in the high RF or microwave spectra).

Each of the access points 104(1)-(n) can serve one or more of client devices 106, 108. As illustrated, client devices 106(1)-(n) and 108(1)-(n) can connect to the access points 104-(1) and 104(n) respectively. For purposes of our discussion, access points 104(1)-(n) will be interchangeably referred to as access points 104 and client devices would be denoted as client devices 106, 108.

Figure 2:
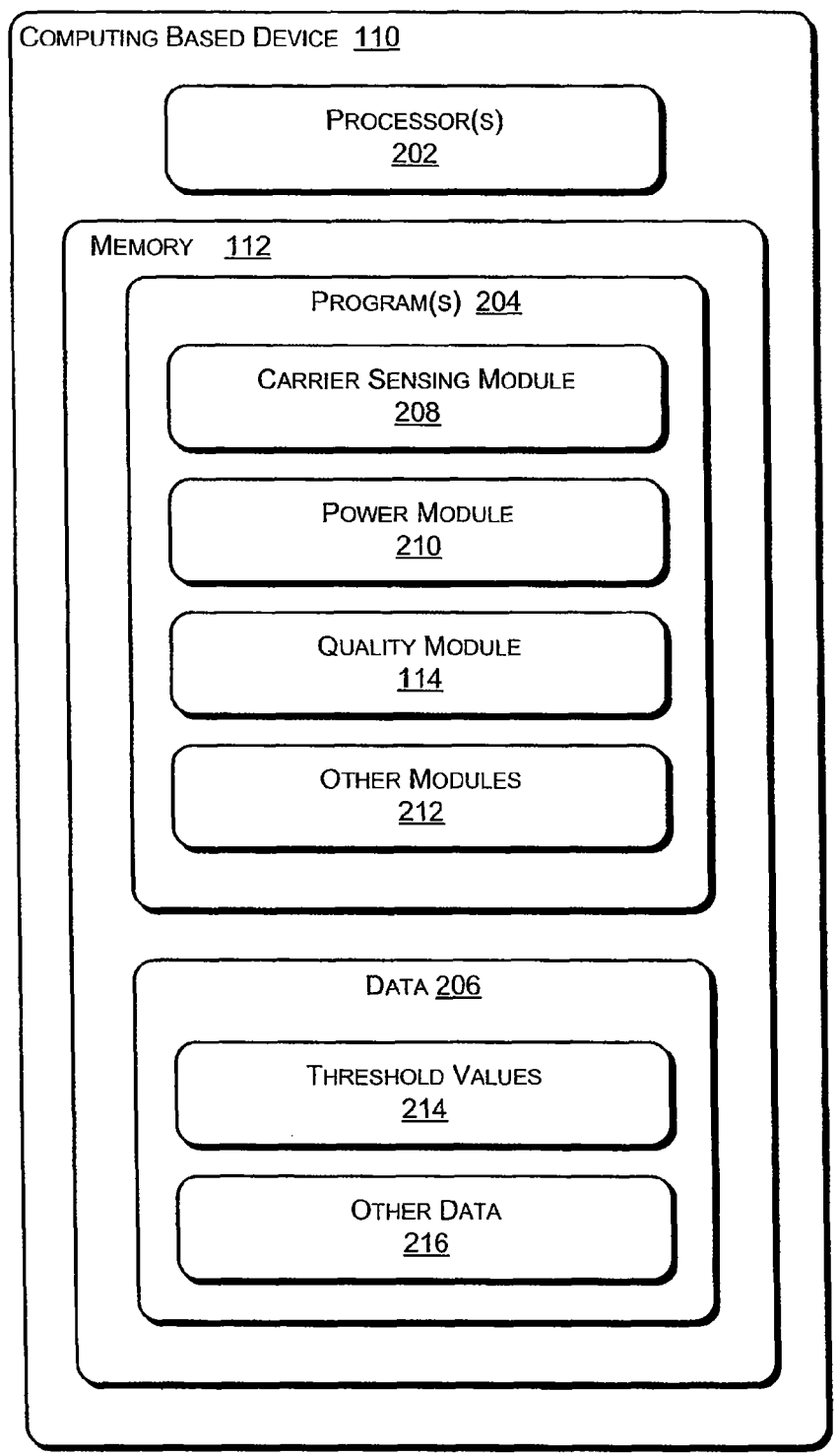
FIG. 2 is an implementation of a computing device for frame level adaptive carrier sensing and power control.

In the example of FIG. 1, client devices 106, 108 can be one or more of personal computers (PCs), application servers, and any other computing-based device. Moreover, the network 100 can include any number of client devices 106, 108. For example, in one implementation, network 100 can be a company network, including a large number of PCs, servers, and other computing-based devices spread throughout a large physical area. Alternately, in another possible implementation, network 100 can include a home network with a limited number of PCs belonging to a single family. Each of the access points 104 includes a computing-based device 110. The computing-based device 110 includes a memory 112. As shown in FIG. 1, the memory 112 stores a quality module 114. The quality module 114 monitors the quality of trans-mission of a communication, where the transmission is responsive to the change in the carrier sensing threshold and the transmission power. Depending on the quality of the ongoing transmission, the quality module 114 can change the transmission rate. For example, quality module 114 can increment the transmission rate for each successful transmission and can decrement the transmission rate for a failed transmission. The manner in which the rate of transmission is incremented can be considered cautious while the manner in which the rate of transmission is decremented can be considered vigorous. A cautious upside and vigorous downside approach ensures that an improved network throughput is achieved, but not at the expense of the transmission quality. FIG. 2 further describes the functioning of the quality module 114 and other components of computing-based device 110.

FIG. 2

FIG. 2 is an implementation of a computing device for frame level adaptive carrier sensing and power control.

To this end, the computing-based device 110 includes one or more processor(s) 202 and memory 112. Processor(s) 202 might include, for example, microprocessors, microcomputers, state machines, logic circuitries, and/or any devices that manipulate data and/or signals based on operational instructions. Among other capabilities, processor(s) 202 fetch and execute computer-readable instructions stored in memory 112.

Memory 112 can include any computer-readable medium known in the art including, for example, volatile memory (e.g., RAM) and/or non-volatile memory (e.g., flash, etc.), removable memory, etc. As illustrated in FIG. 2, memory 112 also can include program(s) 206 and data 208. Generally, the programs can be embodied as instructions on one or more computer-readable media. Program(s) 206 include, for example, carrier sensing module 208, power module 210, quality module 114, and other modules 212. Other modules 212 include programs that supplement applications for an access point, applications for determining various intrinsic features associated with the access point like temperature, battery power, and so on.

As described earlier, the quality module 114 can increment the transmission rate for each successful transmission and can decrement the transmission rate for a failed transmission. The manner in which the rate of transmission is incremented can be considered cautious while the manner in which the rate of transmission is decremented can be considered vigorous.

The transmission rate to be varied is responsive to the change in the carrier sensing threshold value and the transmission power. The carrier sensing threshold value, which can be stored as threshold value(s) 214, can be dynamically adjusted by the carrier sensing module 208. The carrier sensing module 208 can sense the availability of the channel over which transmission has to be affected, depending on the carrier sensing threshold value. If the carrier sensing module 208 detects the availability of the channel, it proceeds with the transmission. However, if the channel is being used, the transmission is deferred to a later instance and resumed on the availability of the channel. Determining the availability of the channel, referred to as carrier sensing, is done so as to avoid data packet collision at one or more of the access points 104(1)-(n).

In one implementation, the carrier sensing module 208 senses the availability of the channel by comparing the carrier sensing threshold value with a channel-specific value, like signal-to-noise ratio (SNR) associated with the channel. For example, the carrier sensing module 208 on finding the carrier sensing threshold value, to be greater than the SNR value associated with the channel, determines that the channel is available for transmission. On the other hand, a SNR value associated with the channel, greater than the carrier sensing threshold value would indicate the non-availability of the channel in consideration.

It is desirable that the carrier sensing range of an AP, say access points 104, be kept small. The carrier sensing range is inversely related to the carrier sensing threshold value. A large carrier sensing range can enable the access points 104 to initiate communication with its neighboring access points 104, thereby causing interference with the neighboring access points 104. A small carrier sensing range tends to geographically concentrate the client devices 106, 108 around the access points 104. Hence a smaller carrier sensing range can prevent the access points 104 from interfering with the operations of its neighbors and vice versa. Within the area delineated due to a small carrier sensing range or setting a high carrier sensing threshold value, client devices 106, 108 can communicate with the access points 104 via wireless transmission. The trans-mission of the signal to be sent to the access points 104 is done at a certain transmission power value. Higher transmission power ensures a good quality of transmission but may cause data loss due to interference, i.e. co-channel interference, at neighboring access points 104.

The transmission power of a communication signal is managed by the power module 210. The power module 210 adjusts the transmission power level which is sufficient to sustain a transmission rate before the carrier sensing threshold value was changed. Changing the transmission power reduces interference of the communication signal with the neighboring AP say, access points 104. In one implementation, the changes in transmission power can be implemented dynamically or manually through the power module 210. In another implementation, the power module 210 sets the transmission power to value which is half of the difference between minimum SNR and the current SNR for a transmission rate.

Generally in a wireless network, the number of client devices 106, 108 within the proximity of the access points 104 may vary. In such cases some of the client devices 106, 108 may be located close to an AP, say access points 104, while some may be located far away. The power module 210 aggressively reduces the transmission power of client devices 106, 108 that are closer to the access points 104. A reduction in the transmission power of these client devices 106, 108 can reduce the co-channel interference at the neighboring access points 104.

The carrier sensing module 208 reduces the carrier sensing range by increasing the carrier sensing threshold value. As previously indicated, reducing the carrier sensing range concentrates the number of client devices 106, 108 that can communicate with one or more of the access points 104. The reduction in the number of client devices 106, 108 increases the number of concurrent transmission, but may affect the quality of transmission due to increased co-channel interference.

From the above it can be gathered that a high value of the carrier sensing threshold enables more concurrent transmissions but at the risk of significantly increasing the mutual interference level over the same channel. The increase in the mutual interference affects the performance of the system 100. Conversely a smaller value of the carrier sensing threshold, which is indicative of high carrier sensing range, reduces the mutual interference but also decreases the number of concurrent transmission.

A high value of transmission power improves the throughput of the data being transmitted to the intended receiver, say one or more of the client devices 106, 108, but also tends to increase the mutual interference at other neighboring client devices 106, 108 attempting to communicate with one or more of the AP. On the other hand, if the transmission power value is small, mutual interference at other APs is reduced along with the reduction of the SNR and quality of the data transmission.

FIG. 3

Figure 3:
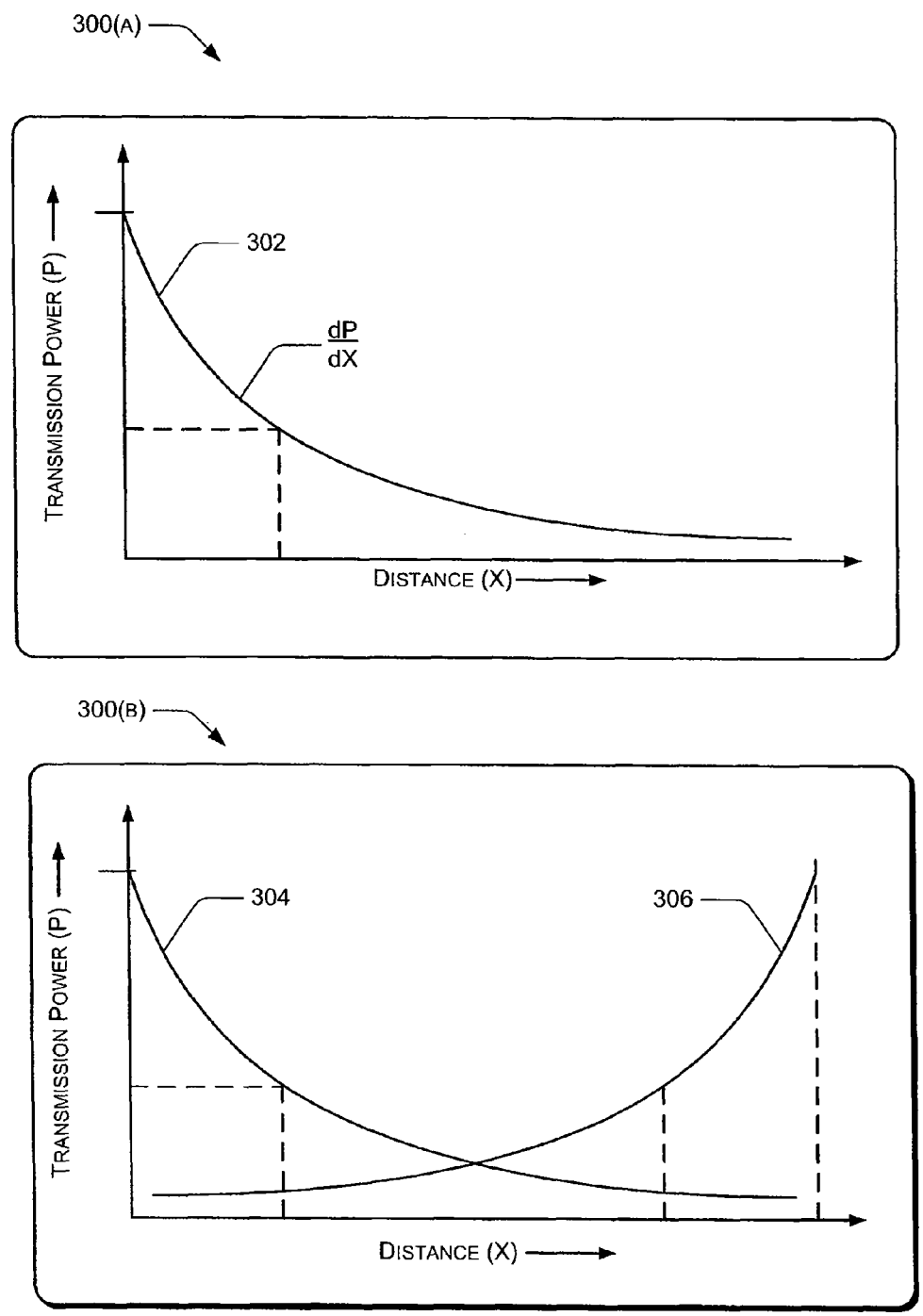
FIG. 3 is a graphical representing illustrating variation of transmission power with distance.

FIG. 3 is a graphical representing illustrating variation of transmission power with distance.

FIG. 3 illustrates graphs 300(*a*) and 300(*b*) depicting the variations in trans-mission power of a communication signal with distance.

The graph 300(*a*) indicates the variation in transmission power at one of the access point, say access point 104-1. Similarly, graph 300(*b*) indicates the variation in transmission power of two access points that are communicating with one or more client devices 106, 108.

Typically, the transmission power of a communication decreases exponentially with distance as depicted by variation 302. The absolute value of the transmission power monotonically decreases with distance. Since the transmission power decreases exponentially, the decrease is more evident for smaller distances and becomes more or less constant with increasing distances. Consequently, small changes in farther distance have a lesser impact to the transmission power as compared to changes at closer distances. In graph 300(*b*) the variation of the transmission power is indicated by variations 304, 306 respectively for the access points.

In order to implement an effective communication between a receiving and a transmitting device, a transmitter can transmit either discretely or explicitly. This is analogous to a situation where one or more individuals within an enclosed space converse with other. In order to effectively converse, they can either speak softly or whisper to avoid disturbing other conversations, or speak as loudly as possible to effectively communicate to the intended listener. The entire success of a communication can additionally depend on the noise near the intended listener. For example, if an individual realizes that the level of noise around the intended listener is more, it will make the necessary efforts to converse loudly, to ensure that the communication can be delivered to the intended listener.

Typically a transmitter would transmit a communication discretely (speak softly), in case the noise level near the receiving device is low. On the other hand, the transmitting device would communicate explicitly (speak loudly), in case it determines the noise level in the proximity of the receiving device above a threshold value. Explicit communication can be implemented by transmitting at a high transmission power. In cases where the a high value of transmission power is used, the carrier sensing threshold can be varied to enable other devices within the carrier sensing range to communicate with the receiver upon making a determination that the receiving device would be able to receive communication, despite the surrounding noise.

As indicated previously, variations in the carrier sensing range (and consequently the carrier sensing threshold value) and the transmission power result in the change in throughput of the network system. However, in some cases, increase in the throughput of the network system may not ensure good transmission quality. To this end, the quality module 114 monitors and determines the quality of the ongoing data transmission. The ongoing data transmission is a resultant of the variation of the carrier sensing threshold value (and therefore also induces a change in the carrier sensing range).

In one implementation, the quality module 114 monitors and determines the quality of the transmission of the data packets or frames to ascertain whether the given value of the carrier sensing threshold should be retained or not. If the data trans-mission or frame transmission for a certain value of carrier sensing threshold value is successful, the quality module 114 increments the rate of the frame transmission. In another implementation, the frame transmission rate is increased by one. For example, if an ongoing transmission is proceeding at a rate, say six data frames per unit time, then the quality module 114 increments the transmission rate to seven frames per unit time.

In one implementation, the increase in the frame transmission rate is accompanied with the decrease in the transmission power. For example, the quality module 114 on increasing the frame transmission rate instructs the power module 210 to decrease the transmission rate. In another implementation, the power module 210 decreases the transmission power to a value that lies between the SNR value associated with the ongoing transmission, and a minimum required SNR value for the transmission. In such a manner, the quality module 114 continuously increments the frame transmission rate for a given carrier sensing threshold value.

However, as indicated previously, increase in the carrier sensing threshold value can adversely affect the throughput of an ongoing transmission. If during the ongoing transmission, a transfer of a data frame was unsuccessful, the number of the frame rates to be transmitted is decreased. Hence for future transmissions, the frame transmission rate is less than the rate of the ongoing transmission. In one implementation, the frame transmission rate is reduced to half of the transmission rate of the ongoing transmission. The quality module 114 therefore follows a cautious approach while incrementing the data frame transmission rate and an aggressive approach while reducing the transmission rate. The upside cautious and the downside aggressive approach ensures that transmission quality is given preference over a high network system throughput.

FIG. 4

Figure 4:
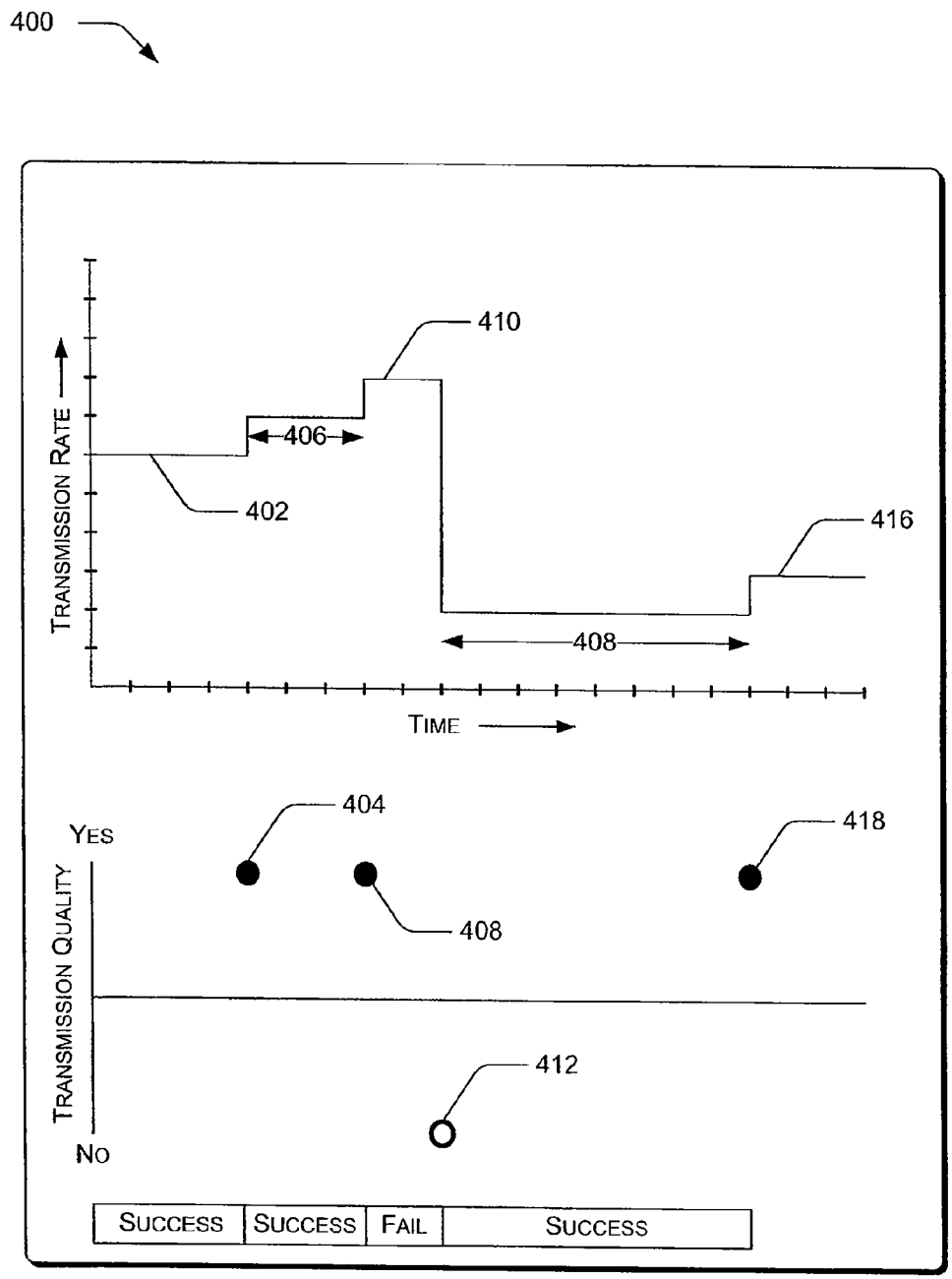
FIG. 4 is a plot illustrating the variation of transmission rate with time in a network system implementing frame level adaptive carrier sensing and power control.

FIG. 4 is a plot illustrating the variation of transmission rate with time in a network system implementing frame level adaptive carrier sensing and power control.

FIG. 4 illustrates a plot 400 indicating variations in transmission rate with time in a network system implementing frame level adaptive carrier sensing and power control.

Graph 400(*a*) indicates the variation of the transmission rate with time, which is associated with the transmission quality indicated by graph 400(*b*). In graph 400(*a*), the variation 402 in the transmission rate is dependent on whether the transmission of data packets or frames succeeds or not. For a successful transmission of a data packet occurs, the success is indicated by point 404. On detecting a successful transmission, the transmission rate is increased by one. In one implementation, the quality module 114 detects the successful transmission of the data frames, and increments the transmission rate by one.

Once increased, the transmission persists for a time indicated by time 406. For the time 406, the quality module 114 monitors the quality of transmission. If the transmission of the data frames communicated is complete, i.e. to say that no frames are lost during the ongoing transmission, the transmission rate is further increased by a factor of one. For example, if the quality module 114 determines a successful transmission, it increases the transmission rate by a factor of one. In one implementation, the quality module 114 continues to increment the transmission rate by one for each determination of a successful transmission of a data frame, as indicated by point 408. The increased transmission again persists for a time 410.

In case communication of a data frame fails, as indicated by point 412, the quality module 114 decreases the transmission rate to a value that is nearly half of the transmission rate at which the ongoing transmission was proceeding. The transmission rate is reduced aggressively to ensure that the quality of the transmission is given priority over the increase in the throughput of the network system. The decreased transmission rate continues for a time 414. The quality module 114 increases the transmission rate by a factor of one for a successful transmission of a data packet, as indicated by point 418. The process of cautiously increasing and vigorously decreasing the transmission rate ensures that an improved network throughput is achieved but not at the expense of the quality of transmission.

In one implementation, the adaptive carrier sensing and power control techniques are implemented using a rate adaptation algorithm for improving the system throughput. In such a scenario, the rate adaptation algorithm is used for estimating the transmission quality. In another implementation, the rate adaptation algorithm is implemented in the quality module 114. The quality module 114 implementing the rate adaptation algorithm utilizes various one or more statistical data associated with the frame data to be transmitted. Depending on the quality of the ongoing transmission, the quality module 114 adjusts the frame transmission rate to the sender, say one or more of the client devices 106, 108.

In one implementation, the quality module 114 collects statistical data associated with the frame data. The quality module 114 also monitors and determines the number of data frames losses during the ongoing transmission. The quality module 114 compares the number of data frame losses with one or more threshold values. Based on the comparison, the data frame rate is either increased or decreased. For example, if the number of losses of data frame is above a first threshold value, then the quality module 114 decreases the frame transmission rate, say to half of the transmission rate of the ongoing transmission. If the number of losses of data frames is less than a second threshold value, the quality module 114 increases the transmission rate, say by one. If none of the above indicated relations exist then the quality module 114 does not change the rate of transmission of the ongoing transmission.

FIG. 5

Figure 5:
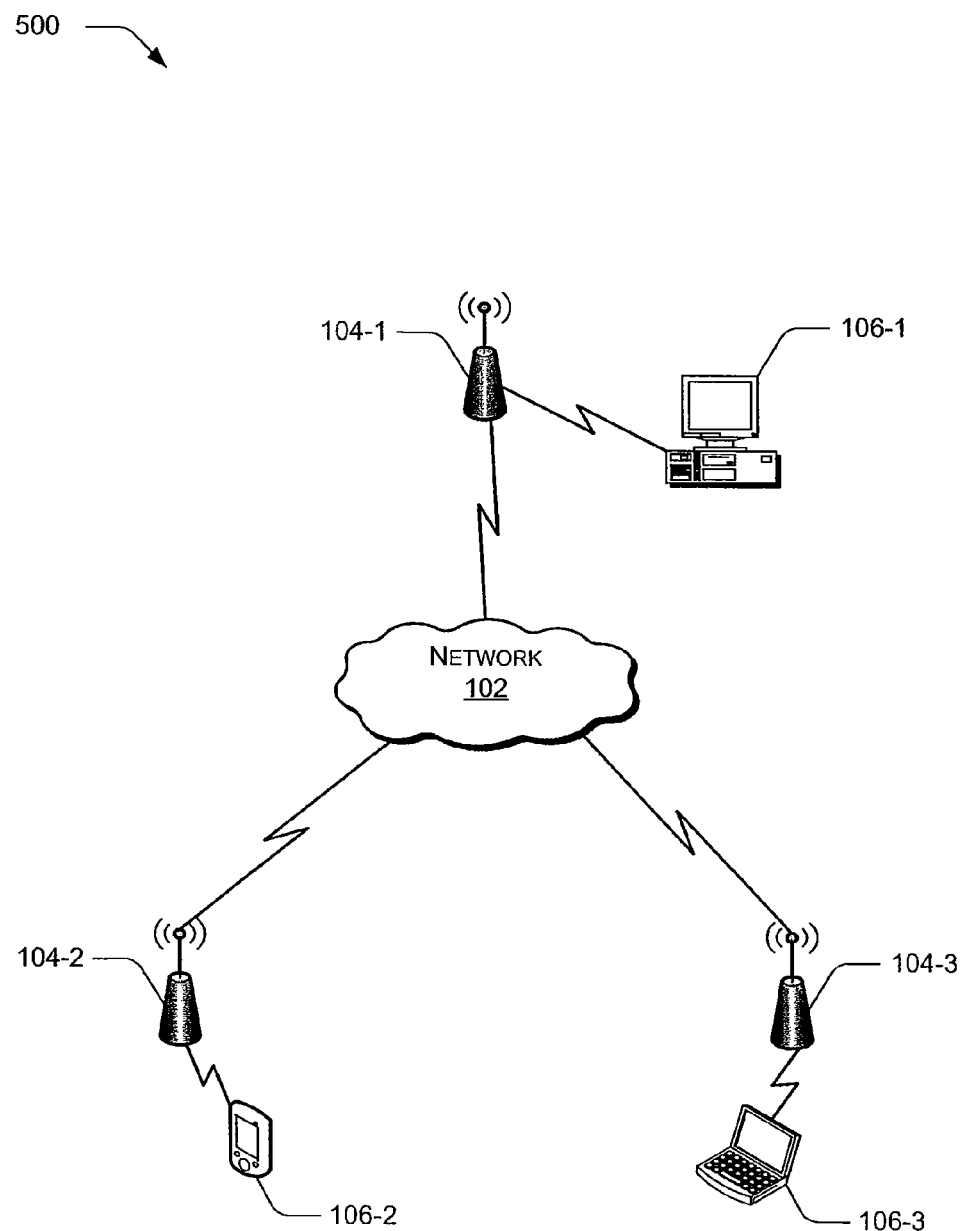
FIG. 5 is an illustration of a test set-up implementing' frame level adaptive carrier sensing and power control.

FIG. 5 is an illustration of a test set-up implementing frame level adaptive carrier sensing and power control.

FIG. 5 illustrates a test set-up for testing frame level adaptive carrier sensing and power control for wireless networks.

To this end, the wireless network 102 employs a test set-up 500. The test can be used to determine the effectiveness of the frame level adaptive carrier sensing and power control for wireless networks. The test set-up 500 indicates three access points 104-1, 104-2, 104-3 that are capable of communicating with each other, for example, through network 102. The techniques as described in conjunction with FIGS. 1-4 are then implemented in each of the access points 104-1, 104-2, 104-3. The throughput of each of the access points 104-1, 104-2, 104-3 is then determined.

Initially in the example as illustrated all of the access points 104-1, 104-2, 104-3 implement one or more rate adaptation algorithms for increasing the throughput of the system, say system 100. The techniques for frame level adaptive carrier sensing and power control is then implemented in each of the access points 104-1, 104-2, 104-3 progressively. Implementing such techniques result in an increase in the network performance. The following table depicts results of the various trials conducted to measure the network throughput with and without frame level adaptive carrier sensing and power control implemented in the access points 104-1, 104-2, 104-3.

Post implementation of the techniques for frame level adaptive carrier sensing and power control in the access points 104-1, 104-2, 104-3, the performance of the network system, say system 100 increases.

FIG. 6

Figure 6:
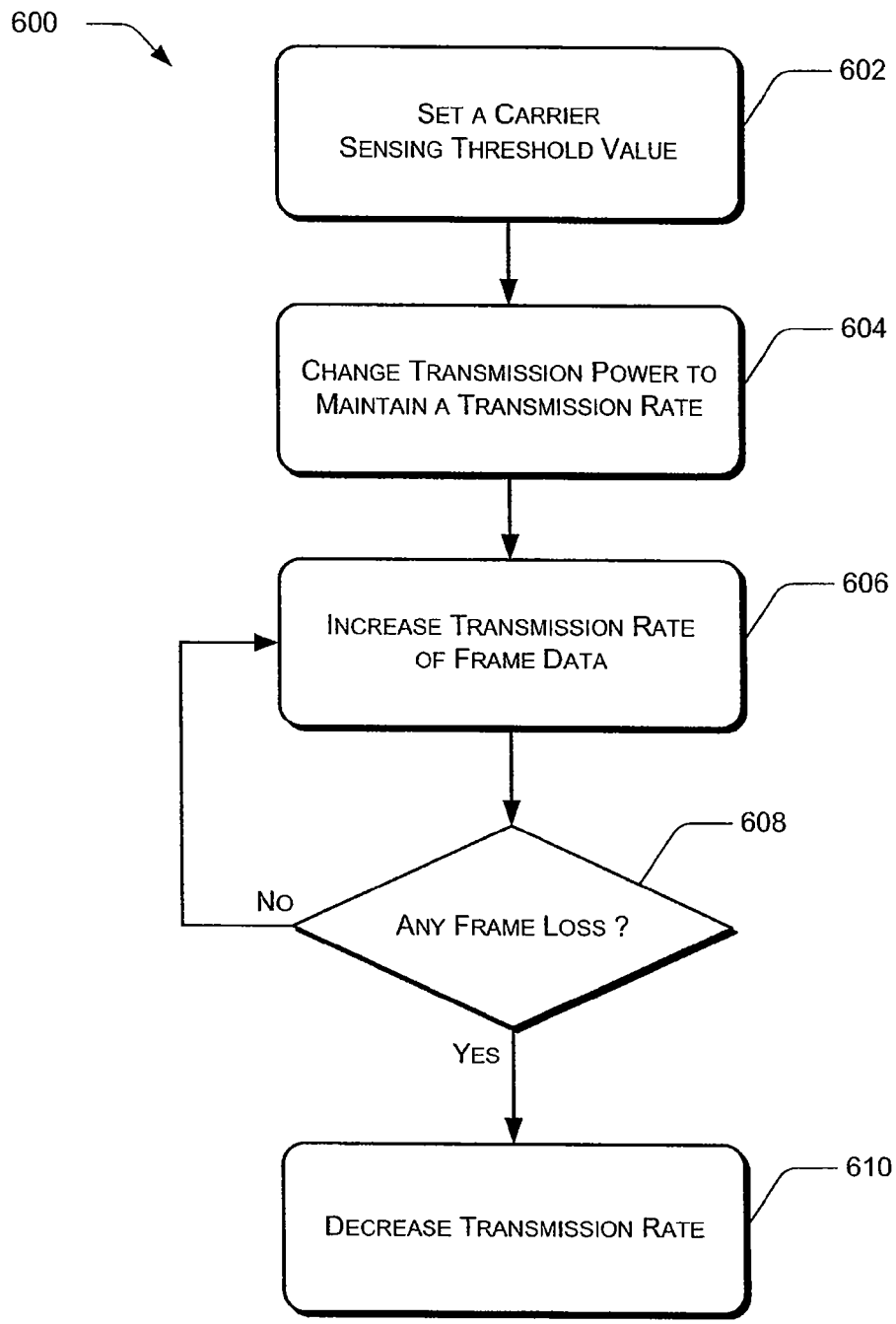
FIG. 6 is an exemplary method for frame level adaptive carrier sensing and power control.

FIG. 6 is an exemplary method for frame level adaptive carrier sensing and power control.

FIG. 6 illustrates an exemplary process for frame level adaptive carrier sensing and power control for wireless networks.

The exemplary process 600 performs adaptive carrier sensing through one or more devices, say client devices 106, 108 deployed, which are capable of communicating with each other through network 102, and access points 104-1 to n. The order of the steps as indicated in process 600 should not be construed as a limitation. It is understood that certain acts in the method need not be performed in the order described, and may be modified, and/or may be omitted entirely, depending on the circumstances.

At block 602, a carrier sensing threshold value is defined. For example, the carrier sensing module 208 defines the carrier sensing threshold value. As indicated previously, carrier sensing enables communicating devices to manage a large number of competing transmissions to an intended AP. Carrier sensing can be implemented by varying a carrier sensing threshold value in a manner inversely proportional to a carrier sensing range within which concurrent transmissions from one or more communicating devices may occur. A high value of carrier sensing threshold value ensures a higher number concurrent transmission that can happen at a given AP.

At block 604, transmission power is changed such that the change in the transmission power does not affect the transmission rate of an ongoing transmission. In one implementation, the power module 210 determines the transmission rate of an ongoing transmission and changes the transmission rate so as to maintain the transmission rate of the ongoing transmission. Generally the information exchange between one or more access points or APs, is in the form of packets or data frames. A high value of transmission power ensures a better network system throughput but may result in interference at one or more of the neighboring APs.

At block 606, the transmission rate of the data frames being transmitted is increased. For example, the quality module 114 increases the number of data frames that are being transmitted for the given carrier sensing threshold value and the transmission power. In one implementation, the transmission rate of the data frames is incremented by one.

At block 608, any frame losses that have occurred during the course of transmission are determined. For example, the quality module 114 determines and monitors the data frames being transmitted. The quality module 114 determines if any frames are lost during the ongoing transmission.

If no frames are lost during transmission ("no" path from block 608, the quality module 114 increments the transmission rate of frame data. In one implementation, the transmission rate is increased by one. On the other hand, if the loss of frame data is detected ("yes" path from block 608, then at block 610 the transmission rate of data frames of the ongoing transmission is decreased. For example, the quality module 114 decreases the transmission rate of the data frames if it detects any loss of the frames. In one implementation, the quality module 114 decreases the transmission rate by a value which is half of the transmission rate of the ongoing transmission.

The quality module 114 monitors the quality of the ongoing transmission and takes the necessary actions to maintain it. The increase in the transmission rate can be considered to be cautious while the decrease in the transmission rate, on detecting a frame loss, can be considered to be vigorous. Such a cautious upside approach and a vigorous downside approach ensures that an efficient system throughput is maintained but not at the cost of transmission quality.

Any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by the resource modeling application. Communication media typically embodies computer-readable instructions, data structures, program modules, or other data on any information delivery media. Combinations of the any of the above should also be included within the scope of computer-readable media.

CONCLUSION

Although the invention has been described in language specific to structural features and/or methodological acts for implementing an exemplary method for frame level adaptive carrier sensing and power control, it is to be understood that the invention is not necessarily limited to the specific features or acts described. Rather, the specific features and acts are disclosed as exemplary forms of implementing the invention.

The invention claimed is:

1. A method, comprising:
adjusting at least one of a carrier sensing threshold and a transmission power during wireless transmission of data to one or more networked devices, wherein a carrier sensing threshold is adjusted in a manner that is inversely proportional to the carrier sensing range, and wherein transmission power is adjusted to a level sufficient to sustain a transmission rate before the carrier sensing threshold value was changed;
measuring transmission rates, latency and quality of transmission corresponding to the adjustments; and
selecting a transmission rate and latency meeting a threshold for quality of transmission.

2. The method of claim 1,
wherein measuring transmission rates further comprises measuring latency and transmission rates and quality of transmission, and
wherein selecting the transmission rate comprises selecting the transmission rate and latency meeting the threshold for quality of transmission.

3. The method of claim 1, further comprising:
setting at least one of the carrying sensing threshold and the transmission power during incremental adjustments.

4. The method of claim 1, further comprising:
responsive to the transmission rate no longer meeting the threshold for quality of transmission, decrementing at least one of the carrier sensing threshold and the transmission power and repeating the steps of measuring and selecting.

5. The method of claim 1, further comprising:
responsive to the transmission rate meeting the threshold for quality of transmission over a predetermined period of time, incrementing at least one of the carrier sensing threshold and the transmission power and repeating the steps of measuring and selecting.

6. The method of claim 1, further comprising:
responsive to the transmission rate no longer meeting the threshold for quality of transmission, decrementing at least one of the carrier sensing threshold and the transmission power and repeating the steps of measuring and selecting; and
responsive to the transmission rate meeting the threshold for quality of transmission over a predetermined period of time, incrementing at least one of the carrier sensing threshold and the transmission power and repeating the steps of measuring and selecting, wherein a decrementing step is larger than an incrementing step.

7. The method of claim 1, wherein measuring the transmission rate and quality of transmission comprises:
determining a number of data frame losses during transmission.

8. The method of claim 1, wherein adjusting the at least one of the carrier sensing threshold and the transmission power comprises:
adjusting the at least one of the carrier sensing threshold and the transmission power of a first access point during wireless transmission of data to one or more networked devices to prevent interference with transmissions between at least a second access point and other networked device transmissions.

9. The method of claim 1, wherein adjusting the at least one of the carrier sensing threshold and the transmission power comprises:
dynamically adjusting during transmission.

10. The method of claim 1, wherein adjusting the at least one of the carrier sensing threshold and the transmission power comprises:
determining whether to adjust the carrier sensing threshold or the transmission power based on a class of service provided to at least one of the networked devices.

11. A non-transitory computer-readable medium storing a computer program product for, when executed by a processor, performing a method, the method comprising:
adjusting at least one of a carrier sensing threshold and a transmission power during wireless transmission of data to one or more networked devices, wherein a carrier sensing threshold is adjusted in a manner that is inversely proportional to the carrier sensing range, and wherein transmission power is adjusted to a level sufficient to sustain a transmission rate before the carrier sensing threshold value was changed;
measuring transmission rates, latency and quality of transmission corresponding to the adjustments; and
selecting a transmission rates and latency meeting a threshold for quality of transmission.

12. The computer-readable medium of claim 11,
wherein measuring transmission rate further comprises measuring latency and transmission rates and quality of transmission, and wherein selecting the transmission rate comprises selecting the transmission rate and latency meeting the threshold for quality of transmission.

13. The computer-readable medium of claim 11, further comprising:
setting at least one of the carrying sensing threshold and the transmission power during incremental adjustments.

14. The computer-readable medium of claim 11, further comprising:
responsive to the transmission rate no longer meeting the threshold for quality of transmission, decrementing at least one of the carrier sensing threshold and the transmission power and repeating the steps of measuring and selecting.

15. The computer-readable medium of claim 11, further comprising:
responsive to the transmission rate meeting the threshold for quality of transmission over a predetermined period of time, incrementing at least one of the carrier sensing threshold and the transmission power and repeating the steps of measuring and selecting.

16. The computer-readable medium of claim 11, further comprising:
responsive to the transmission rate no longer meeting the threshold for quality of transmission, decrementing at least one of the carrier sensing threshold and the transmission power and repeating the steps of measuring and selecting; and
responsive to the transmission rate meeting the threshold for quality of transmission over a predetermined period of time, incrementing at least one of the carrier sensing threshold and the transmission power and repeating the steps of measuring and selecting, wherein a decrementing step is larger than an incrementing step.

17. The computer-readable medium of claim 11, wherein measuring the transmission rate and quality of transmission comprises:
determining a number of data frame losses during transmission.

18. The computer-readable medium of claim 11, wherein adjusting the at least one of the carrier sensing threshold and the transmission power comprises:
adjusting the at least one of the carrier sensing threshold and the transmission power of a first access point during wireless transmission of data to one or more networked devices to prevent interference with transmissions between at least a second access point and other networked device transmissions.

19. The computer-readable medium of claim 11, wherein adjusting the at least one of the carrier sensing threshold and the transmission power comprises:
dynamically adjusting during transmission.

20. The computer-readable medium of claim 11, wherein adjusting the at least one of the carrier sensing threshold and the transmission power comprises:
determining whether to adjust the carrier sensing threshold or the transmission power based on a class of service provided to at least one of the networked devices.

21. An access point at least partially implemented in hardware, comprising:
a memory;
a carrier sensing module, at least partially implemented in the memory, to adjust at least one of a carrier sensing threshold and a transmission power during wireless transmission of data to one or more networked devices, wherein a carrier sensing threshold is adjusted in a manner that is inversely proportional to the carrier sensing range, and wherein transmission power is adjusted to a level sufficient to sustain a transmission rate before the carrier sensing threshold value was changed;
a power module to adjust a transmission power during wireless transmission of data to one or more networked devices, wherein at least one of the carrier sensing module and the power module makes an adjustment; and
a quality module to measure transmission rates, latency and quality of transmission corresponding to the adjustments, and select a transmission rate meeting a threshold for quality of transmission.

22. The access point of claim 21, wherein the quality module measures transmission rates and latency and quality of transmission corresponding to the adjustments, and selects the transmission rate and latency meeting the quality of transmission.

23. The access point of claim 21, wherein the carrier sensing module sets the carrier sensing threshold during incremental adjustments of the transmission power, and the power module sets the transmission power during incremental adjustments of the carrier sensing threshold.

24. The access point of claim 21, wherein the carrier sensing or power module, responsive to the transmission rate no longer meeting the threshold for quality of transmission, decrements at least one of the carrier sensing threshold and the transmission power and repeating the steps of measuring and selecting.

25. The access point of claim 21, wherein the carrier sensing or power module, responsive to the transmission rate meeting the threshold for quality of transmission over a predetermined period of time, increments at least one of the carrier sensing threshold and the transmission power and repeating the steps of measuring and selecting.

26. The access point of claim 21, wherein the carrier sensing or power module, responsive to the transmission rate no longer meeting the threshold for quality of transmission, decrements at least one of the carrier sensing threshold and the transmission power and repeating the steps of measuring and selecting, and responsive to the transmission rate meeting the threshold for quality of transmission over a predetermined period of time, increments at least one of the carrier sensing threshold and the transmission power and repeating the steps of measuring and selecting, wherein a decrementing step is larger than an incrementing step.

27. The access point of claim 21, wherein the quality module determines a number of data frame losses during transmission.

28. The access point of claim 21, wherein the carrier sensing or power module adjusts the at least one of the carrier sensing threshold and the transmission power of a first access point during wireless transmission of data to one or more networked devices to prevent interference with transmissions between at least a second access point and other networked device transmissions.

29. The access point of claim 21, wherein the carrier sensing or power module dynamically adjusts during transmission.

30. The access point of claim 21, wherein the carrier sensing or power module determines whether to adjust the carrier sensing threshold or the transmission power based on a class of service provided to at least one of the networked devices.

* * * * *